United States Patent [19]

Chung

[11] Patent Number: 5,754,211
[45] Date of Patent: May 19, 1998

[54] IMAGE FORMING APPARATUS WITH A SINGLE DRIVING SOURCE

[75] Inventor: Kwang-Young Chung, Suwon, Rep. of Korea

[73] Assignee: SamSung Electronics Co., Ltd., Suwon, Rep. of Korea

[21] Appl. No.: 529,807

[22] Filed: Sep. 18, 1995

[30] Foreign Application Priority Data

Nov. 28, 1994 [KR] Rep. of Korea .............. 31508/1994

[51] Int. Cl.⁶ ............................................ G01D 15/10
[52] U.S. Cl. ............................................ 347/153
[58] Field of Search ................................ 347/153, 154, 347/242, 226, 244, 259, 261, 131, 133, 134; 399/118, 188, 218, 221

[56] References Cited

U.S. PATENT DOCUMENTS

| | | | |
|---|---|---|---|
| 3,982,831 | 9/1976 | Kingsley | 355/5 |
| 4,161,359 | 7/1979 | Masham | 355/8 |
| 4,484,810 | 11/1984 | Spinelli | 355/8 |
| 4,623,239 | 11/1986 | Zambelli | 355/8 |
| 4,761,662 | 8/1988 | Yoshimoto et al. | 346/108 |
| 4,816,845 | 3/1989 | Soya et al. | 346/108 |
| 4,939,552 | 7/1990 | Nakanishi | 355/300 |
| 4,945,385 | 7/1990 | Kimura | 355/202 |
| 5,030,993 | 7/1991 | Miyasaka et al. | 355/234 |
| 5,113,225 | 5/1992 | Deguchi | 355/235 |
| 5,280,379 | 1/1994 | Sugiura | 359/217 |
| 5,355,153 | 10/1994 | Yasuda | 346/108 |
| 5,404,206 | 4/1995 | Andoh et al. | 355/235 |
| 5,416,505 | 5/1995 | Eguchi et al. | 347/244 |
| 5,512,927 | 4/1996 | Okamoto | 347/129 |
| 5,585,627 | 12/1996 | Akutsu et al. | 250/234 |

*Primary Examiner*—Adolf Berhane
*Attorney, Agent, or Firm*—Robert E. Bushnell, Esq.

[57] ABSTRACT

An image forming apparatus uses a single motor to drive both a photosensitive drum and a polygonal mirror of a laser scanning unit, thereby reducing the size and cost of the image forming apparatus. In a preferred embodiment, the single motor provides rotational power to the photosensitive drum via a plurality of reduction gears, and further provides rotational power to the polygonal mirror of the laser scanning unit via belts and bevel gears.

18 Claims, 2 Drawing Sheets

IMAGE FORMING APPARATUS WITH A SINGLE DRIVING SOURCE

CROSS-REFERENCE TO RELATED APPLICATIONS

This application makes reference to, incorporates the same herein, and claims all benefits accruing under 35 U.S.C. §119 from an application for *Image Forming Apparatus With A Single Driving Source* earlier filed in the Korean Industrial Property Office on 28 Nov. 1994 and there assigned Ser. No. 31508/1994.

BACKGROUND OF THE INVENTION

The present invention relates to an image forming apparatus with a single driving source, and more particularly, to an image forming apparatus for driving a photosensitive member and a rotating polygonal mirror using one motor as a single driving source.

Conventionally, image forming apparatuses, such as photocopiers and laser beam printers, have used separate driving motors to operate a photosensitive member and a scanning unit. This need has been, at least in part, attributable to differences in the amount of rotational power required by each of these components.

One prior art reference that seeks to improve the performance of a driving source in an image forming apparatus is disclosed in U.S. Pat. No. 5,113,225 entitled *Optical System Driving Device* issued to Deguchi on May 12, 1992. In Deguchi '225, an optical system driving device including a lamp unit which emits an optical beam for scanning an object, a photosensitive member which receives reflected light from the object, and a mirror unit which is disposed between the lamp unit and the photosensitive member and guides the reflected light to the photosensitive member uses a rack-pinion unit connected to the mirror unit and the lamp unit to move the respective units according to a predetermined speed ratio. While Deguchi '225 is purportedly capable of adjusting relative positions between the lamp unit and the mirror unit, I believe that an improved driving source for an image forming apparatus can be contemplated.

SUMMARY OF THE INVENTION

Accordingly, it is an object of the present invention to provide an improved driving mechanism in an image forming apparatus.

It is another object to provide an image forming apparatus for driving a photosensitive drum and a laser scanning unit with only one driving motor.

It is still another object to provide an image forming apparatus that adjusts image resolution without adversely effecting a process of scanning light representative of image data on the surface of a photosensitive drum.

It is yet another object to provide an image forming apparatus having a reduced size by using only one driving motor.

It is still yet another object to provide an image forming apparatus having a reduced production cost by using only one driving motor.

These and other objects can be achieved in accordance with the principles of the present invention with a single driving motor that drives both a photosensitive drum and a polygonal mirror of a laser scanning unit. The single driving motor provides rotational power to the photosensitive drum via a plurality of reduction gears, and further provides rotational power to the polygonal mirror of the laser scanning unit via belts and bevel gears.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
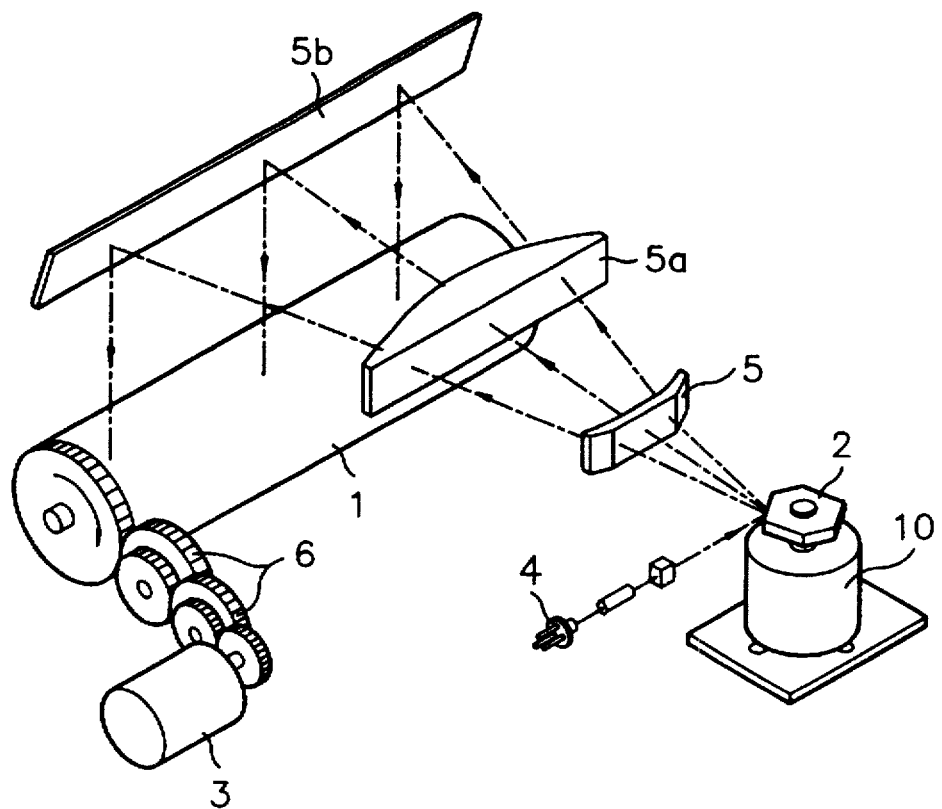
FIG. 1 illustrates a driving mechanism of a conventional image forming apparatus.

Turning now to the drawings and referring to FIG. 1, the driving mechanism of a conventional image forming apparatus is shown. The conventional image forming apparatus of FIG. 1 uses separate driving motors to operate a photosensitive member and a laser scanning unit.

In the image forming apparatus of FIG. 1, a first driving motor 3 is used to transmit rotational power to a photosensitive drum 1 through a plurality of variable speed gears 6. A second driving motor 10 is used to transmit rotational power to a rotating polygonal mirror 2 of the laser scanning unit. Second driving motor 10 is driven by constant speed control logic and is installed beneath polygonal mirror 2. A reflecting mirror 5b, a convex lens 5a and a concave lens 5 are installed between photosensitive drum 1 and polygonal mirror 2. Light emitted from a laser diode 4 is sequentially reflected by polygonal mirror 2, concave lens 5, convex lens 5a and reflecting mirror 5b so that it is scanned onto the outer surface of photosensitive drum 1. Accordingly, an electrostatic latent image is formed on the outer surface of photosensitive drum 1.

The electrostatic latent image is then developed on a printable medium, such as paper, to produce a hard copy of the image. That is, the image forming apparatus of FIG. 1 produces the hard copy through a process of charging, exposing, developing, transferring and cleaning. To enable this process, second driving motor 10 rotates polygonal mirror 2 of the laser scanning unit at a constant speed. Since second driving motor 10 is used as an independent driving source, it must be operated in synchronization with the other components of the image forming apparatus.

Therefore, second driving motor 10 of the laser scanning unit operates to provide fixed values of speed, resolution, etc., which are different from the requirements of first driving motor 3. This, in turn, increases the size and design complexity of the image forming apparatus. Furthermore, since separate driving motors are used to operate the laser scanning unit and photosensitive drum 1, the cost of the image forming apparatus increases.

In the conventional image forming apparatus of FIG. 1, second driving motor 10 of the laser scanning unit is a direct-current (DC) motor and requires about five seconds of operation in order to become synchronized with the operation of first driving motor 3. Accordingly, there is a delay before the printing operation can be commenced.

Figure 2:
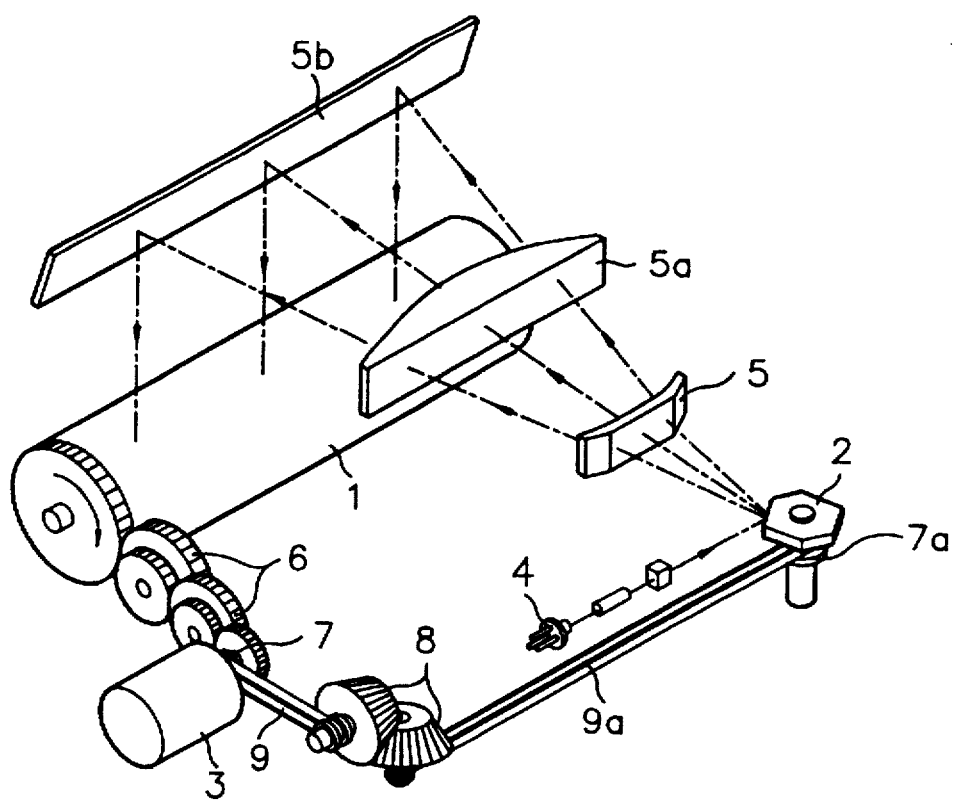
FIG. 2 illustrates a driving mechanism of an image forming apparatus constructed according to the principles of the present invention.

Referring to FIG. 2, the driving mechanism of an image forming apparatus constructed according to the principles of the present invention will now be described. In FIG. 2, a photosensitive drum 1 and a polygonal mirror 2 operating as a light reflecting device within a laser scanning unit are driven by a single driving motor 3. A plurality of reduction gears 6 act as a gear train forming first power transmission and are engaged with one another between photosensitive drum 1 and driving motor 3 to transmit rotational power from driving motor 3 to photosensitive drum 1. Belts 9 and 9a and bevel gears 8 act as a second power transmission and are installed between driving motor 3 and polygonal mirror 2 to transmit rotational power between driving motor 3 and polygonal mirror 2. Polygonal mirror 2 rotates in a stationary manner. Typically, since photosensitive drum 1 rotates much slower than polygonal mirror 2, the first power transmission acts to reduce the rotational speed received from driving motor 3 while second power transmission acts to increase the rotational speed received from driving motor 3.

A reflecting mirror 5b, a convex lens 5a and a concave lens 5 are installed between photosensitive drum 1 and polygonal mirror 2. Light emitted from a laser diode 4 is sequentially reflected by polygonal mirror 2, concave lens 5, convex lens 5a and reflecting mirror 5b so that it is scanned onto the outer surface of photosensitive drum 1.

The second power transmission between polygonal mirror 2 and driving motor 3 transmits rotational power from driving motor 3 to polygonal mirror 2 and simultaneously regulates the rotational speed ratio between polygonal mirror 2 and driving motor 3.

Bevel gears 8 are installed as a conduit in the second power transmission to shift the direction of the rotational power of driving motor 3 by approximately 90°. Belt 9 is connected between bevel gears 8 and a pulley 7 of driving motor 3, and belt 9a is connected between a pulley 7a of polygonal 2 and bevel gears 8, to transmit the rotational power from driving motor 3 to polygonal mirror 2.

In a practice of the present invention, polygonal mirror 2 of the laser scanning unit does not use an independent driving motor as a source of rotational power. That is, polygonal mirror 2 receives rotational power through the second power transmission from driving motor 3, which is the main system driving source. Therefore, the rotational speed of polygonal mirror 2 can be synchronized with system operations using software which varies the rotational speed according to an amount of data being processed or user inputs.

Also in the present invention, since polygonal mirror 2 of the laser scanning unit does not use an independent driving motor as a source of rotational power, the height of the laser scanning unit is lower than the conventional laser scanning unit, and the noise which would be generated by a separate driving motor for the laser scanning unit is eliminated. Furthermore, the 5 second stand-by time required with the conventional image forming apparatus of FIG. 1 is not necessary. The cost of the apparatus is also reduced by eliminating circuitry of the driving motor and associated parts which occupy about one half of the space taken up by the laser scanning unit. Synchronization of operations of the image forming apparatus of the present invention can be achieved, and will be discussed below.

Assuming that the image forming apparatus of the present invention is set to print four pages per minute (PPM) at 300 dots per inch (dpi), and that the number of reflecting surfaces of polygonal mirror 2 is selected to be six, wherein one reflecting surface of polygonal mirror 2 corresponds to one scan line, a paper feeding velocity Vp is expressed as:

$$Vp = \frac{\text{(the length of A4 paper + the margin of paper)} \times 4 \text{ PPM}}{60 \text{ sec}}.$$

If the margin is set to 60 mm, then $$Vp = \frac{(297 \text{ mm} + 60 \text{ mm}) \times 4}{60 \text{ sec}} = 23.8 \text{ mm/sec}.$$

Therefore, the paper feeding velocity Vp is approximately 23.8 mm/sec, and the scan time of one line is obtained by dividing a paper feeding distance corresponding to one line (i.e., 1/300 inches) by the paper feeding velocity Vp. That is, the scan time Mt of one line is expressed as:

$$Mt = \frac{\frac{1}{300} \text{ inches}}{Vp} = \frac{\frac{1}{300} \times 25.4 \text{ mm}}{23.8 \text{ mm/sec}} = 3.557 \text{ ms}.$$

Since polygonal mirror 2 has six surfaces with each surface corresponding to one line, a rotational velocity $r_M$ of polygonal mirror 2 is expressed as:

$$r_M = \frac{1}{3.557 \times 10^{-3} \text{ (sec)}} \times \frac{60 \text{ (sec)}}{6} = 2,811 \text{ (RPM)}$$

Therefore, assuming the rotational velocity of driving motor 3 is set to 1,000 revolutions per minute (RPM), rotational velocity $r_M$ of polygonal mirror 2 is set to 2.811 times the rotational speed of driving motor 3. Accordingly, design parameters for bevel gears 8, which are used to transmit rotational power from driving motor 3 to polygonal mirror 2 via belts 9 and 9a, can be chosen to provide a proper rotational speed for polygonal mirror 2. Similarly, the design parameters of reduction gears 6 can be chosen to provide the proper rotational speed for photosensitive drum 1.

As described above, the inventive image forming apparatus of the present invention uses only one driving motor to operate both the laser scanning unit and the photosensitive member. Therefore, the size and cost of the image forming apparatus can be reduced.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An image forming apparatus, comprising:
    a single motor for generating rotational power;
    a photosensitive drum disposed to spread an electrostatic latent image over an outer surface of said photosensitive drum during rotation of said photosensitive drum;
    a polygonal mirror positioned to reflect light across said outer surface of said photosensitive drum to enable formation of said electrostatic latent image spread over said outer surface of said photosensitive drum during rotation of said polygonal mirror;
    first power transmitting means for receiving said rotational power from said single motor, adjusting a magnitude of said rotational power to generate a first adjusted rotational power, and transmitting said first adjusted rotational power to said photosensitive drum to enable said rotation of said photosensitive drum; and second power transmitting means for receiving said rotational power from said single motor, adjusting said magnitude of said rotational power to generate second adjusted rotational power, and transmitting said second adjusted rotational power to said polygonal mirror to enable said rotation of said polygonal mirror.

2. The image forming apparatus of claim 1, wherein said first power transmitting means comprises a plurality of gears arranged in meshed engagement between said a single motor and said photosensitive drum.

3. The image forming apparatus of claim 1, wherein said second power transmitting means comprises:

a first belt connected to said single motor for receiving said rotational power from said single motor;

a first bevel gear connected to said first belt for receiving said rotational power from said single motor via said first belt;

a second bevel gear arranged in meshed engagement with said first bevel gear for receiving said rotational power from said single motor via said first bevel gear and said first belt and generating said second adjusted rotational power; and a second belt connected to said second bevel gear for receiving said second adjusted rotational power from said second bevel gear and transmitting said second adjusted rotational power to said polygonal mirror to enable said rotation of said polygonal mirror.

4. The image forming apparatus of claim 1, wherein said first power transmitting means adjusts said magnitude of said rotational power downwardly to generate said first adjusted rotational power by reducing a rotational speed provided by said rotational power.

5. The image forming apparatus of claim 1, wherein said second power transmitting means adjusts said magnitude of said rotational power upwardly to generate said second adjusted rotational power by increasing a rotational speed provided by said rotational power.

6. An image forming apparatus, comprising:

a single motor for generating rotational power;

a photosensitive drum disposed to spread an electrostatic latent image over an outer surface of said photosensitive drum during rotation of said photosensitive drum;

an exposing unit positioned to reflect light across said outer surface of said photosensitive drum to enable formation of said electrostatic latent image spread over said outer surface of said photosensitive drum during rotation of said exposing unit;

a plurality of gears for receiving said rotational power from said single motor and transmitting said rotational power to said photosensitive drum to enable said rotation of said photosensitive drum;

first means for receiving said rotational power from said single motor and altering a direction of said rotational power to generate a directionally altered rotational power; and second means for receiving said directionally altered rotational power from said first means and transmitting said directionally altered rotational power to said exposing unit to enable said rotation of said exposing unit.

7. The image forming apparatus of claim 6, wherein said first means comprises:

a first belt connected to said single motor for receiving said rotational power from said single motor;

a first bevel gear connected to said first belt for receiving said rotational power from said single motor via said first belt; and a second bevel gear arranged in meshed engagement with said first bevel gear for receiving said rotational power from said single motor via said first bevel gear and said first belt and generating said directionally altered rotational power.

8. The image forming apparatus of claim 7, wherein said second means comprises a second belt connected to said second bevel gear for receiving said directionally altered rotational power from said second bevel gear and transmitting said directionally altered rotational power to said exposing unit to enable said rotation of said exposing unit.

9. The image forming apparatus of claim 6, wherein said exposing unit comprises a rotating polygonal mirror.

10. The image forming apparatus of claim 6, wherein said first means alters said direction of said rotational power by approximately 90 degrees to generate said directionally altered rotational power.

11. The image forming apparatus of claim 8, wherein said first means alters said direction of said rotational power by approximately 90 degrees to generate said directionally altered rotational power.

12. The image forming apparatus of claim 6, further comprising means for generating said light reflected by said exposing unit across said outer surface of said photosensitive drum.

13. The image forming apparatus of claim 12, wherein said means for generating said light comprises a laser diode.

14. An image forming apparatus, comprising:

a single motor for generating rotational power;

a photosensitive drum disposed to spread an electrostatic latent image over an outer surface of said photosensitive drum during rotation of said photosensitive drum;

exposing means positioned to reflect light across said outer surface of said photosensitive drum to enable formation of said electrostatic latent image over said outer surface of said photosensitive drum during rotation of said exposing unit;

a plurality of gears for receiving said rotational power from said single motor and transmitting said rotational power to said photosensitive drum to enable said rotation of said photosensitive drum;

a first belt for receiving said rotational power from said single motor;

a plurality of bevel gears for receiving said rotational power from said first belt; and a second belt for receiving said rotational power from said plurality of bevel gears and transmitting said rotational power to said exposing means to enable said rotation of said exposing means.

15. The image forming apparatus of claim 14, wherein said plurality of bevel gears alter a direction of said rotational power by approximately 90 degrees.

16. The image forming apparatus of claim 14, further comprised of said plurality of gears adjusting a magnitude of said rotational power downwardly by decreasing a rotational speed provided by said rotational power.

17. The image forming apparatus of claim 14, further comprised of said plurality of bevel gears adjusting a magnitude of said rotational power upwardly by increasing a rotational speed provided by said rotational power.

18. The image forming apparatus of claim 14, wherein said exposing means comprises a rotating polygonal mirror.

\* \* \* \* \*